April 24, 1956 — C. GLOVER — 2,742,752
RECIPROCATING CUTTING ASSEMBLY
Filed March 6, 1953

Inventor
C. Glover

United States Patent Office 2,742,752
Patented Apr. 24, 1956

2,742,752
RECIPROCATING CUTTING ASSEMBLY

Cyril Glover, Rednal, England

Application March 6, 1953, Serial No. 340,819

Claims priority, application Great Britain March 10, 1952

1 Claim. (Cl. 56—257)

This invention relates to machines for grass cutting, reaping, hedge cutting or other like purposes.

The object of the invention is to provide the cutting means in a simple and compact form.

The invention comprises in combination a reciprocable cutter, a rotary shaft situated adjacent to the reciprocable cutter, and a cam on the shaft for actuating the said cutter.

Figure 1:
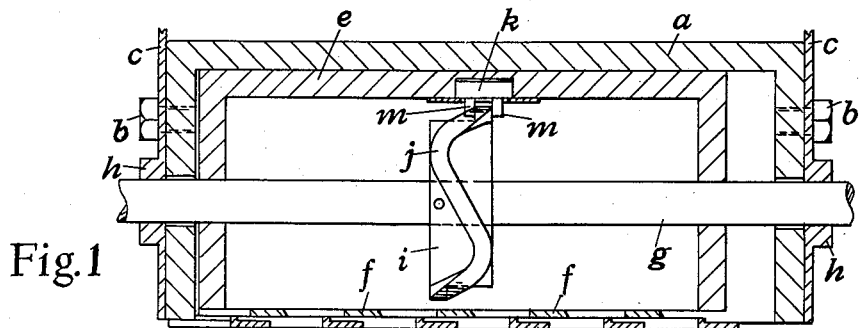
Figure 1 is an elevational view, with parts broken away and shown in section, of the applicant's device.
Figure 2:
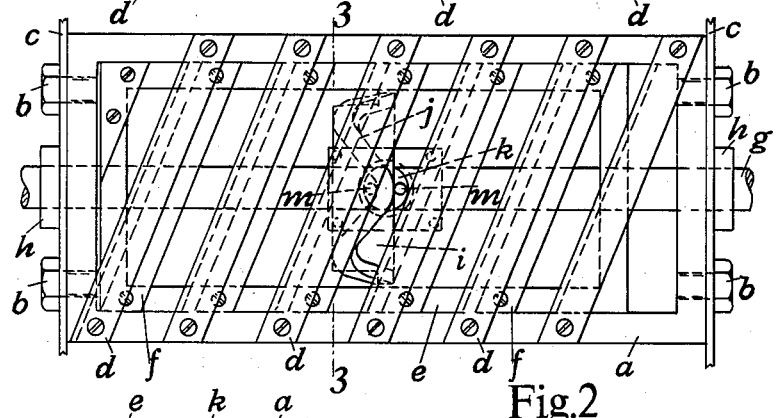
Figure 2 is a bottom plan view of the applicant's device.
Figure 3:
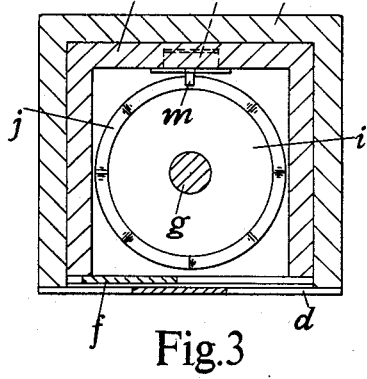
Figure 3 is a cross section taken on the line 3—3 of Figure 2.

In carrying the invention into effect as shown in Figures 1 to 3, there is provided a metal box $a$ which is of rectangular form in cross section, and is adapted at its ends to be secured by screws $b$ to the side members $c$ of a grass cutting, reaping, hedge cutting, or like machine, the box being open at its underside. Across the open underside of the box $a$ are secured any desired number of straight cutting blades $d$, these being disposed obliquely and parallel with each other. Within the box $a$ is mounted a hollow reciprocable slide $e$ of similar cross sectional shape to the box, the upper and side surfaces of the slide being supported by the corresponding inner surfaces of the box, and the length of the slide being sufficiently shorter than the box to permit the required reciprocatory movement of the slide within the box. Across the open underside of the slide $e$ are secured any convenient number of additional straight blades $f$ which form with the slide a reciprocable cutter, and which are disposed similarly to the first mentioned blades $d$ so as to co-operate therewith when reciprocated with the slide.

Extending longitudinally through the box $a$ and the slide $e$ is a rotary shaft $g$ which is adapted to be supported by bearings $h$ on the side members $c$ of the machine. At about the centre of the shaft $g$ is secured a cam $i$ of cylindrical disc-like form having a sinusoidal cam track in the form of a ridge $j$ around its periphery, and on the slide $e$ is mounted a swivel piece $k$ having thereon a pair of pegs $m$ for co-operating with the side surfaces of the cam ridge, the arrangement being such that rotation of the shaft is accompanied by reciprocation of the blades $f$ relatively to the blades $d$.

Instead of having the form of a ridge, the sinusoidal cam track above mentioned may have the form of a groove, in which case the swivel piece $k$ will be provided with a single peg for co-operating with the groove.

Figure 4:
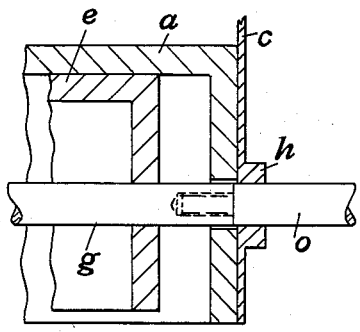
Figure 4 is a fragmentary elevational view, with parts broken away and shown in section, illustrating a modified form of the applicant's device.

Instead of the shaft $g$ being arranged to extend through the supporting bearings $h$ extensions removably attached to the ends of this shaft may extend through these bearings as illustrated by Figure 4 in which one such extension is shown, and is indicated by $o$.

When a cutting unit as above described is incorporated in a lawn mowing, reaping, hedge cutting or other like machine, the shaft $g$ may be rotatable either by ground wheels, or by a source of motion such as an engine or an electric motor.

By this invention cutting means for grass cutting, reaping, hedge cutting or like machines can be provided in a compact form which is simple to construct and effective in operation.

The invention is not, however, limited to the example described as subordinate details may be varied to suit different requirements.

Having thus described my invention, what I claim as new and desire to secure by Letters Patent is:

A machine for grass cutting, reaping, hedge cutting or other like purposes comprising in combination a stationary box having an open under-side and a plurality of blades secured across the open under-side of the box, a second box slidably arranged within said stationary box on a rotary shaft said second box also having an open under-side and a plurality of blades secured across the open under-side for co-operating with the blades on the stationary box, a cam having a sinusoidal cam track mounted upon said rotary shaft, and means carried by said slidable box for engaging said track whereby rotation of said cam is accompanied by reciprocating motion of said second box together with the blades carried thereby.

References Cited in the file of this patent

UNITED STATES PATENTS

| | | |
|---|---|---|
| 14,980 | Youart | May 7, 1856 |
| 957,009 | Smith | May 3, 1910 |
| 1,754,076 | Blackburn | Apr. 8, 1930 |